(12) United States Patent
Senin et al.

(10) Patent No.: US 11,119,885 B2
(45) Date of Patent: Sep. 14, 2021

(54) LATENCY MEASUREMENT IN AN I/O OPERATION OF COMPUTER DATA STORAGE

(71) Applicant: International Business Machines Corporation, Armonk, NY (US)

(72) Inventors: Denis Senin, Basingstoke (GB); Roderick G. C. Moore, Bournemouth (GB); Dan Critchley, Winchester (GB); Jonathan W. L. Short, Eastleigh (GB); Tim McCarthy, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/150,632

(22) Filed: Oct. 3, 2018

(65) Prior Publication Data
US 2020/0110692 A1    Apr. 9, 2020

(51) Int. Cl.
*G06F 11/34* (2006.01)
*G06F 11/30* (2006.01)
*H04L 29/08* (2006.01)

(52) U.S. Cl.
CPC ...... *G06F 11/3485* (2013.01); *G06F 11/3034* (2013.01); *G06F 11/3037* (2013.01); *G06F 11/3476* (2013.01); *H04L 67/1097* (2013.01)

(58) Field of Classification Search
CPC ............. G06F 11/3485; G06F 11/3034; G06F 11/3037; G06F 11/3476; H04L 67/1097
See application file for complete search history.

(56) References Cited

U.S. PATENT DOCUMENTS

| | | | |
|---|---|---|---|
| 7,549,080 B1* | 6/2009 | Gardner | G06F 11/1443 714/6.12 |
| 2016/0283119 A1* | 9/2016 | Frickey, III | G06F 3/0653 |
| 2017/0093678 A1 | 3/2017 | Gnanasekaran | |
| 2018/0052753 A1 | 2/2018 | Chambliss | |
| 2018/0121237 A1 | 5/2018 | Crowe | |
| 2018/0139100 A1* | 5/2018 | Nagpal | G06F 9/45558 |

FOREIGN PATENT DOCUMENTS

| CN | 1941723 A | 4/2007 |
|---|---|---|
| CN | 100579036 C | 4/2007 |

* cited by examiner

*Primary Examiner* — Masud K Khan
(74) *Attorney, Agent, or Firm* — Edward Li

(57) ABSTRACT

A method and a computer program product for latency measurement in an I/O operation. A storage system measures time periods taken in a write I/O operation and, using the measures time periods in the write I/O operation, the storage system monitors a delay that is caused by at least one of a host and a storage area network. A storage system measures time periods taken in a read I/O operation and, using the measures time periods in the read I/O operation, the storage system monitors a delay that is caused by at least one of a host and a storage area network in the read I/O operation.

20 Claims, 5 Drawing Sheets

LATENCY MEASUREMENT IN AN I/O OPERATION OF COMPUTER DATA STORAGE

BACKGROUND

The present invention relates generally to latency measurement in an I/O operation of computer data storage, and more particularly to measuring latency caused by a host or initiator and measuring from a target or storage system side.

In computer data storage, performance problems detected at a level of a host or initiator have many contributing factors, one of which is delays caused by the host or initiator. The common approach of I/O latency monitoring and reporting is done from a host side. This allows only to indicate a fact of performance problems without any specifics about where these performance problems occur: whether the problems occur at a host or initiator level (e.g., problems with filesystems, drivers, etc.), at a network level (e.g., SAN, WAN, LAN, etc.), or at a target or storage system level.

Existing diagnostic techniques cannot satisfy growing speeds of storage systems. An averaging statistical analysis is no longer satisfactory because larger peaks in I/O can be skewed by the sheer volume of I/O that can be processed in a high speed storage environment within a monitoring interval. A typical performance reporting tool provides an average value per reporting interval such as 1 second or 1 minute. A storage system does 10-100 thousands of I/O operations per second and this significant amount of I/O operations per measurement interval can mask those a small amount (e.g., couple of tens) of operations.

SUMMARY

In one aspect, a method for latency measurement in a write I/O operation is provided. The method includes measuring, by a storage system, a time period taken to send a reply from the storage system to a host, in response to receiving a command of a write I/O operation. The method further includes measuring, by the storage system, a time period taken to begin data transfer by the host and a storage area network. The method further includes measuring, by the storage system, a time period taken to transfer each individual portion of data from the host to the storage system. The method further includes measuring, by the storage system, a time period taken to write the data to cache memory, acknowledge the host of completion of the write I/O operation, and write the data on the storage system. In the method, using measured time periods taken in the write I/O operation, the storage system monitors a delay that is caused by at least one of hosts and the storage area network.

In another aspect, a method for latency measurement in a read I/O operation is provided. The method includes measuring, by a storage system, a time period taken to read data from a back end of the storage system, in response to receiving a command of a read I/O operation. The method further includes measuring, by the storage system, a time period taken to transfer each individual portion of the data from the storage system to the host. The method further includes measuring, by the storage system, a time period taken to acknowledge the host of completion of the read I/O operation. In the method, using measured time periods taken in the read I/O operation, the storage system monitors a delay that is caused by at least one of hosts and a storage area network.

In yet another aspect, a computer program product for latency measurement in a write I/O operation is provided. The computer program product comprises one or more computer-readable tangible storage devices and program instructions stored on at least one of the one or more computer-readable tangible storage devices. The program instructions are executable to: measure, by a storage system, a time period taken to send a reply from the storage system to a host, in response to receiving a command of a write I/O operation; measure, by the storage system, a time period taken to begin data transfer by the host and a storage area network; measure, by the storage system, a time period taken to transfer each individual portion of data from the host to the storage system; and measure, by the storage system, a time period taken to write the data to cache memory, acknowledge the host of completion of the write I/O operation, and write the data on the storage system. In the computer program product, using measured time periods taken in the write I/O operation, the storage system monitors a delay that is caused by at least one of hosts and the storage area network.

DETAILED DESCRIPTION

Embodiments of the present invention propose to monitor and report delays caused by an initiator or host and implement monitoring and reporting on a target or storage system side. With this proposed approach, the host is proactively notified about the additional latency that the host injects into total latency of an I/O operation.

Figure 1:
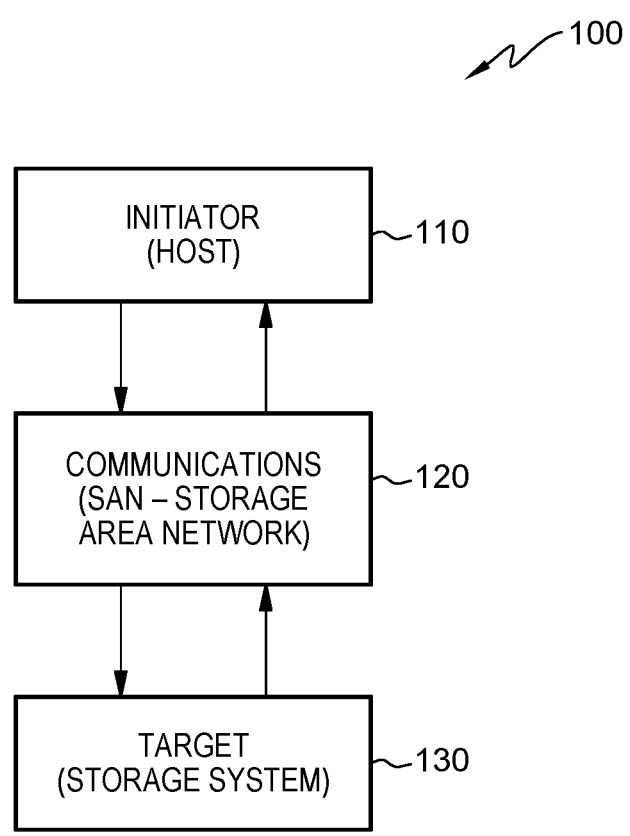
FIG. 1 is a diagram illustrates a storage environment, in accordance with one embodiment of the present invention.

FIG. 1 is a diagram illustrates storage environment 100, in accordance with one embodiment of the present invention. Storage environment 100 comprises initiator or host 110, communications or storage area network (SAN) 120, and target or storage system 130. In storage environment 100, initiator or host 110 initiates an I/O request and receives a response from target or storage system 130. Target or storage system 130 is a storage resource that provides the response to the I/O request received from initiator or host 110 and provides required input/output data transfers over SAN 120.

A single I/O operation includes many sub-operations and actual data transfers. Execution time of each operation and data transfer can be monitored and reported. During the I/O operation, target or storage system 130 and initiator or host 110 exchange commands in order to initiate actual data transmission or requests to retransmit the data if an error happens. In order to initiate data transfer, target or storage system 130 sends a command to initiator or host 110, receives a reply, and starts data transfer to initiator or host 110 or starts to receive actual data from initiator or host 110. The actual time taken by initiator or host 110 is a part of overall latency of the I/O operation and it may be very significant if an I/O subsystem of initiator or host 110 is busy or there are some issues with communications or SAN 120. As latency of the I/O operation is reported at a host level, the actual time of reply from initiator or host 110 is not visible and initiator or host 110 typically blames target or storage system 130 for being slow. This distracts an attention from a real issue and leads to increased time in diagnosis. Reporting of the delays at a storage level significantly improves issue diagnosis simplicity and speed of issue resolution. Instead of having single end monitoring, the current invention proposes to have two-end monitoring and reporting, especially monitoring and reporting from the side of target or storage system 130.

Figure 2:
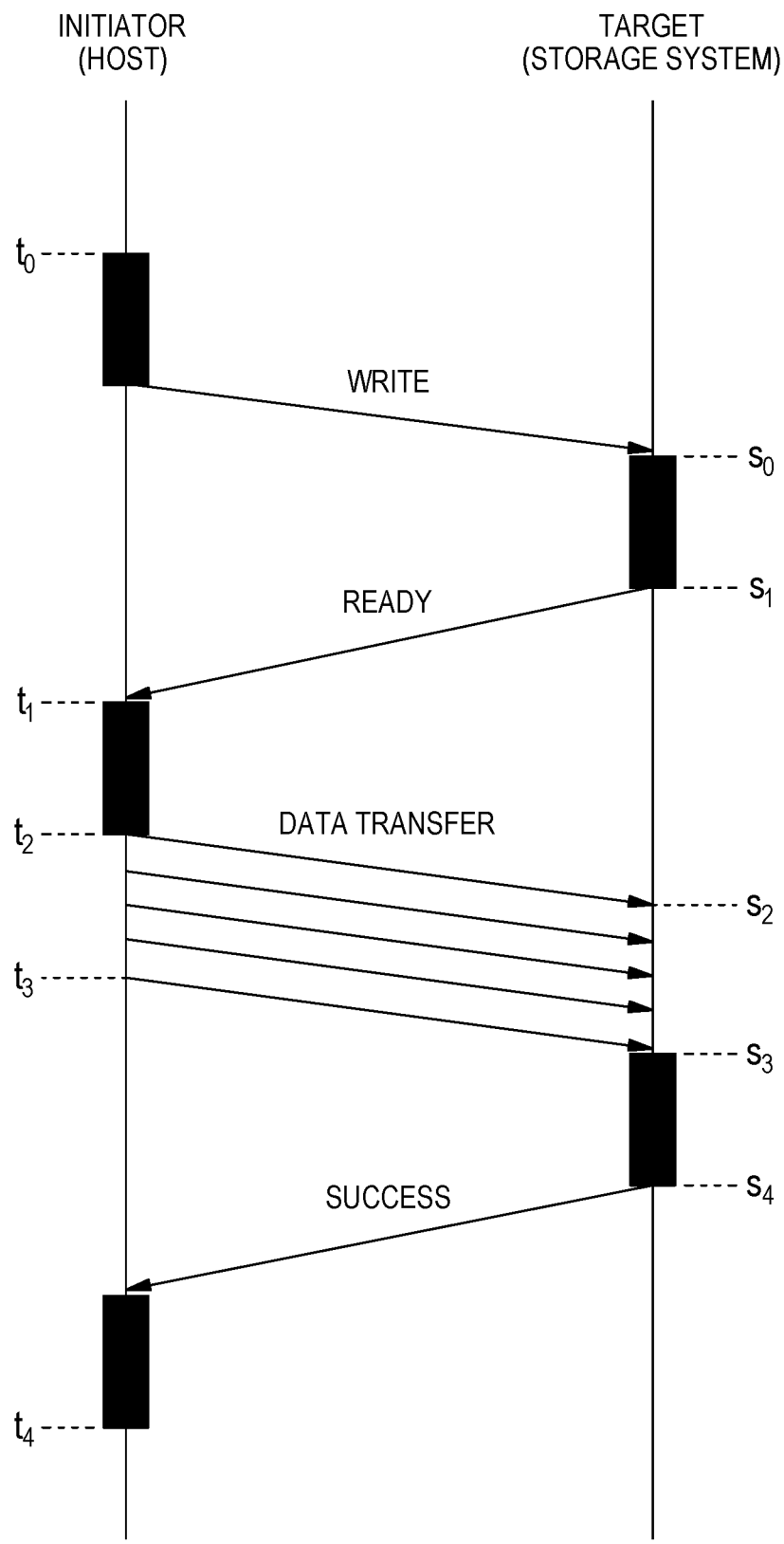
FIG. 2 is a diagram showing full latency of a write I/O operation, in accordance with one embodiment of the present invention.

FIG. 2 is a diagram showing full latency of a write I/O operation, in accordance with one embodiment of the present invention. As shown in FIG. 2, in the write I/O operation and on the side of an initiator or host (e.g., initiator or host 110 shown in FIG. 1), to is the time when the initiator or host sends to a target or storage system (e.g., target or storage system 130 shown in FIG. 1) a command to open a channel for the write I/O operation; $t_1$ is the time when the initiator or host receives a response indicating that the storage system is ready to accept data and the host may start the transfer; $t_2$ is the time when the initiator or storage system starts to send a first individual portion of data; $t_3$ is the time when the initiator or host completes data transfer for all individual portions of the data; and $t_4$ is the time when the initiator or host receives from the target or storage system an acknowledgment of success of the write I/O operation. For the write I/O operation, total transaction performance can be measured by the initiator or host between $t_0$ and $t_4$.

Referring to FIG. 2, on the side of the target or storage system, so is the time when the target or storage system receives from the initiator or host the command for the write I/O operation; $s_1$ is the time when the target or storage system sends to the initiator or host an acknowledgement of being ready for the data transfer; $s_2$ is the time when the target or storage system receives the first individual portion of the data transferred from the initiator or host; $s_3$ is the time when the target or storage system 130 receives all the individual portions of the data; and $s_4$ is the time when the target or storage system sends to the initiator or host 110 the acknowledgment of the success of the write I/O operation.

On the side of the target or storage system, $\Delta S_1 = s_1 - s_0$ is a time period that indicates the performance of the target or storage system in its ability to process an inbound command. $\Delta S_2 = s_2 - s_1$ is a time period taken for the initiator (or host) or a storage area network (e.g., SAN 120 shown in FIG. 1) to begin the data transfer, which can be used to measure a delay caused by at least one of initiators (or hosts) and the storage area network (SAN). $\Delta S_3 = s_3 - s_2$ is a time period taken to transfer each individual portion of data from the initiator or host to the target or storage system. $\Delta S_4 = s_4 - s_3$ is a time period taken for the target or storage system to write the data to cache memory, acknowledge the initiator or host of completion of the write I/O operation, and write the data on the target or storage system. Measuring $\Delta S_1$, $\Delta S_2$, $\Delta S_3$, and $\Delta S_4$ in the write I/O operation, from the side of the target or storage system, is used to monitor latency caused by at least one of the initiator (or host) and the SAN.

Figure 3:
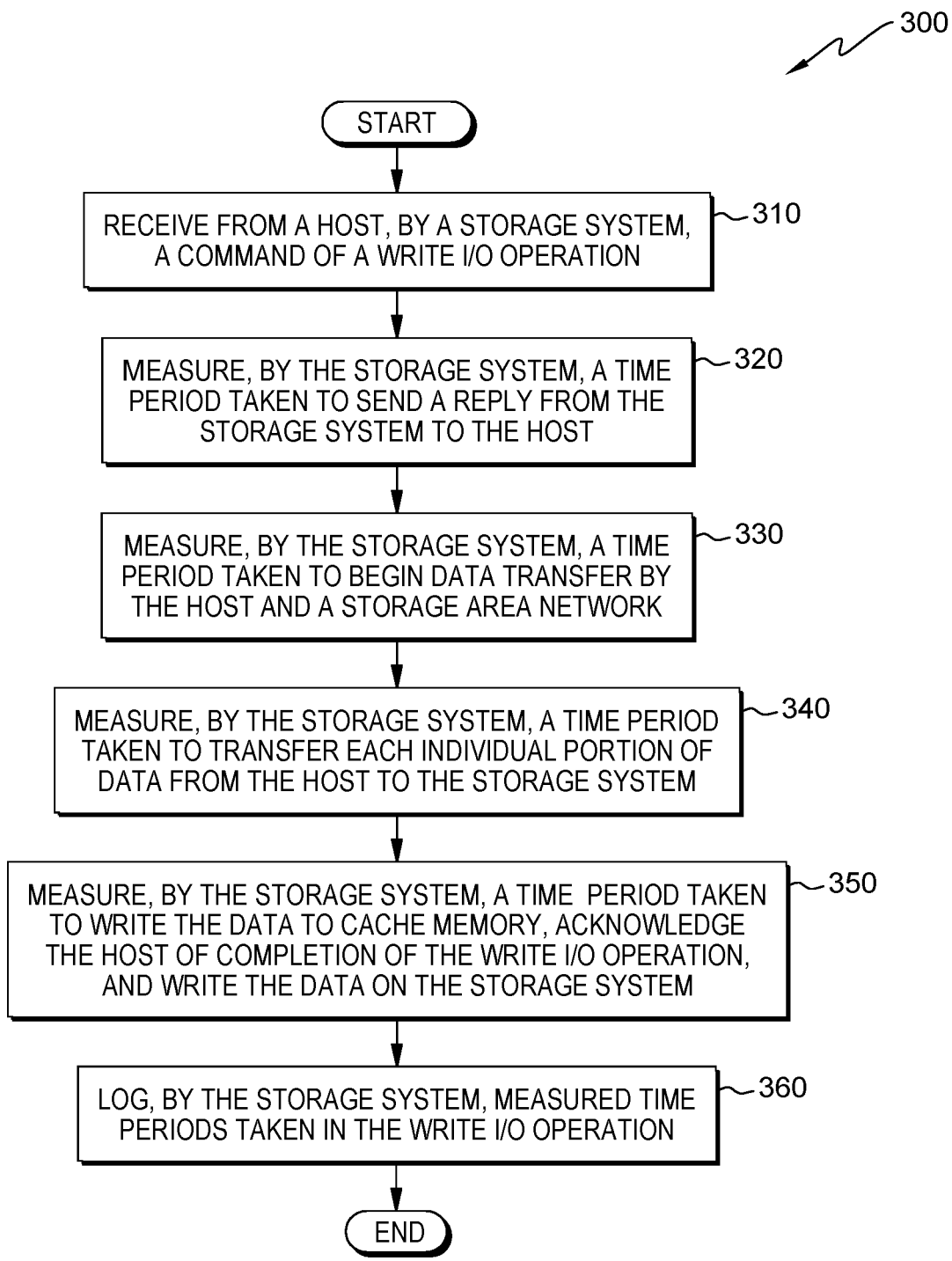
FIG. 3 presents a flowchart showing operational steps of measuring full latency of a write I/O operation, in accordance with one embodiment of the present invention.

FIG. 3 presents flowchart 300 showing operational steps of measuring full latency of a write I/O operation, in accordance with one embodiment of the present invention. At step 310, from a host (e.g., initiator or host 110), a storage system (e.g., target or storage system 130) receives a command of a write I/O operation. The command is sent from the host to the storage system, requesting to open a channel for the write I/O operation.

Referring to FIG. 3, at step 320, the storage system measures a time period taken to send a reply from the storage system to the host. This time period is $\Delta S_1 = s_1 - s_0$ which has been discussed in a previous paragraph with respect to FIG. 2. At step 330, the storage system measures a time period taken to begin data transfer by the host or a storage area network (e.g., SAN 120 shown in FIG. 1). This time period is $\Delta S_2 = s_2 - s_1$ which has been discussed in a previous paragraph with respect to FIG. 2. At step 340, the storage system measures a time period taken to transfer each individual portion of data from the host to the storage system. This time period is $\Delta S_3 = s_3 - s_2$ which has been discussed in a previous paragraph with respect to FIG. 2. At step 350, the storage system measures a time period taken to write the data to cache memory, acknowledge the host of completion of the write I/O operation, and write the data on the storage system. This time period is $\Delta S_4 = s_4 - s_3$ which has been discussed in a previous paragraph with respect to FIG. 2. At step 360, the storage system logs measured time periods taken in the written I/O operation. The measured time periods include $\Delta S_1$, $\Delta S_2$, $\Delta S_3$, and $\Delta S_4$.

Figure 4:
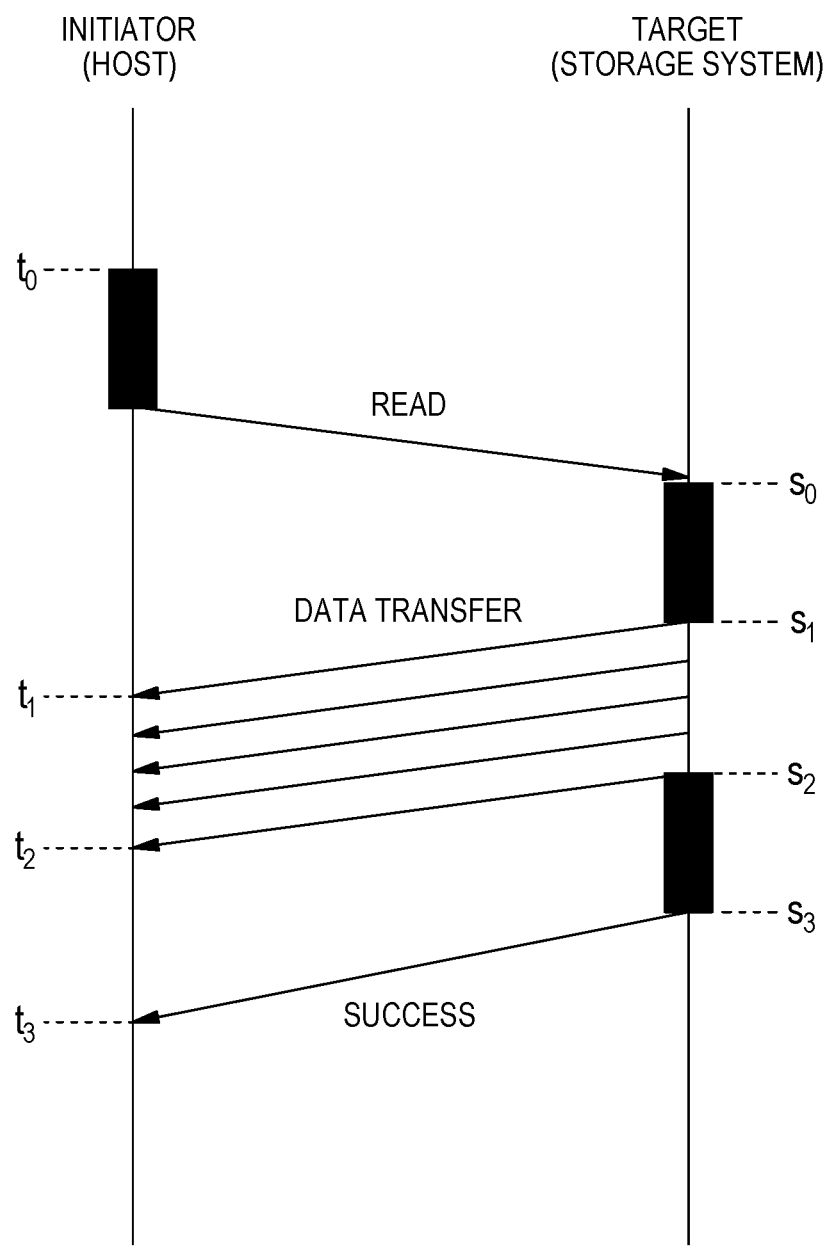
FIG. 4 is a diagram showing full latency of a read I/O operation, in accordance with one embodiment of the present invention.

FIG. 4 is a diagram showing full latency of a read I/O operation, in accordance with one embodiment of the present invention. In the read I/O operation and on the side of an initiator or host (e.g., initiator or host 110 shown in FIG. 1), to is the time when the initiator or host sends to a target or storage system (e.g., target or storage system 130 shown in FIG. 1) a command with a request for specific data from the target or storage system; $t_1$ is the time when the initiator or host receives a first individual portion of data transferred from the target or storage system; $t_2$ is the time when the initiator or host receives all individual portions of the data transferred from the target or storage system; and $t_3$ is the time when the initiator or host receives an acknowledgment of success of the read I/O operation. For the read I/O operation, total transaction performance can be measured by the initiator or host between $t_0$ and $t_3$.

Referring to FIG. 4, on the side of the target or storage system, so is the time when the target or storage system receives the command of the read I/O operation; $s_1$ is the time when the target or storage system sends to the initiator or host the first individual portion of the data; $s_2$ is the time when the target or storage system completes data transfer for all individual portions of the data; and $s_3$ is the time when the target or storage system sends to the initiator or host the acknowledgment of the success of the read I/O operation.

On the side of the target or storage system, $\Delta S_1 = s_1 - s_0$ is a time period that indicates the performance of the target or storage system to read the data from its back end. $\Delta S_2 = s_2 - s_1$ is a time period taken to transfer each individual portion of data from the target or storage system to the initiator or host. $\Delta S_3 = s_3 - s_2$ is a time period taken by the target or storage system to acknowledge the initiator or host of completion of the read I/O operation. Measuring $\Delta S_1$, $\Delta S_2$, and $\Delta S_3$ in the read I/O operation, from the side of the target or storage system, is used to monitor latency caused by at least one of initiators (or hosts) and a storage area network (e.g., SAN 120 shown in FIG. 1).

Figure 5:
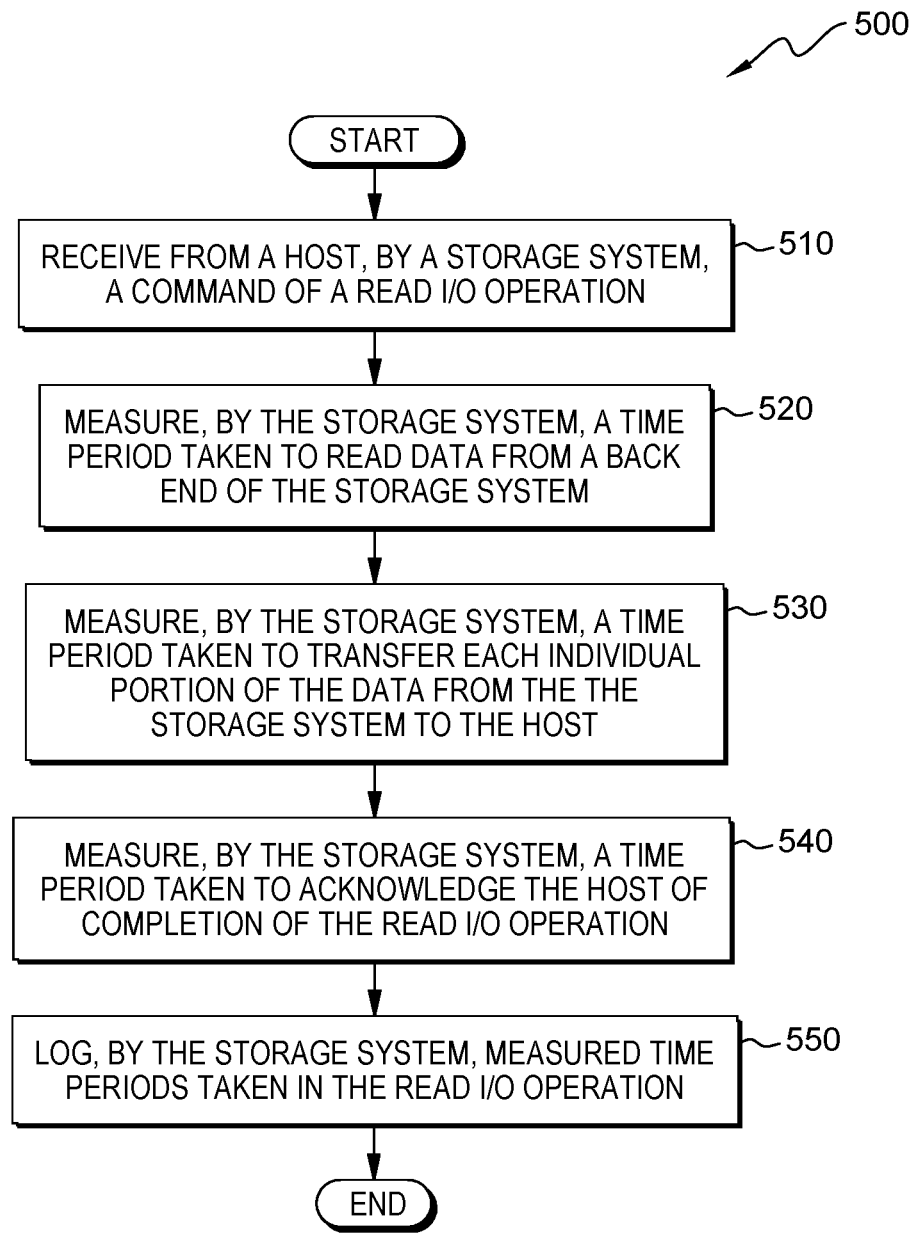
FIG. 5 presents a flowchart showing operational steps of measuring full latency of a read I/O operation, in accordance with one embodiment of the present invention.

FIG. 5 presents flowchart 500 showing operational steps of measuring full latency of a read I/O operation, in accordance with one embodiment of the present invention. At step 510, from a host (e.g., initiator or host 110 shown in FIG. 1), a storage system (e.g., target or storage system 130 shown in FIG. 1) receives a command of a read I/O operation. At step 520, the storage system measures a time period taken to read data from a back end of the storage system. This time period is $\Delta S_1 = s_1 - s_0$ that has been discussed in a previous paragraph with respect to FIG. 4. At step 530, the storage system measures a time period taken to transfer each individual portion of the data from storage system to the host. This time period is $\Delta S_2 = s_2 - s_1$ that has been discussed in a previous paragraph with respect to FIG. 4. At step 540, the storage system measures a time period taken to acknowledge the host of completion of the read I/O operation. This time period is $\Delta S_3 = s_3 - s_2$ that has been discussed in a previous paragraph with respect to FIG. 4. At step 550, the storage system logs measured time periods taken in the read I/O operation. The measured time periods include $\Delta S_1$, $\Delta S_2$, and $\Delta S_3$.

In the present invention, by using the time deltas mentioned in previous paragraphs, it is proposed to monitor on the side of the storage system (e.g., target or storage system 130 shown in FIG. 1) and report the delays caused by at least one of hosts (e.g., initiator or host 110 shown in FIG. 1) and the storage area network (e.g., SAN 120 shown in FIG. 1). The present invention enables to proactively notify the host about the additional latency that the host injects into the total latency of the I/O operation.

Notification of the above mentioned additional latency can be implementation-dependent and maybe through an event log or a notification to the host. Data of the delays caused by the host can also be uploaded to a cloud computing environment for cognitive analysis.

By monitoring data points as described in previous paragraph, using the timings can indicate delays caused by at least one of hosts and the storage area network. The analysis of those timings can proactively notify the hosts of issues that may be causing performance issues outside the scope of the storage system, but still impacting on overall I/O performance.

For example, in a storage environment, a target or storage system has several (e.g., five) initiators or hosts. The latency issues of all hosts are reported. Analyzing the timing data measured from the side of the target or storage system, it can be found that one host is slower than the other hosts and slows down the other hosts as well, because the host's slow transmission slows shared ports and resources. By analyzing delays caused by all the hosts, a slow host can be identified.

In another example, a target or storage system has several initiators or hosts that are connected through different SAN domains to the target or storage system. The latency issues of all hosts are reported. Looking at the host delays and transfer times, it is found that the latency issue occurs in one group of hosts and is the same for all hosts in the group. It can be assumed that the storage area network (SAN) is causing problems; therefore, the SAN is analyzed, instead of analyzing all the hosts.

In the present invention, transient errors cannot be detected and only permanent errors can be detected. Therefore, there should be a statistically significant amount of I/O operations showing the same behavior.

In the present invention, each I/O operation is monitored. The I/O operation has a transmission start and several transmissions happening to complete the I/O operation in full. An I/O operation that has only one transmission is ignored.

By analyzing the timing data measured from the side of the target or storage system, it can be assumed that it is host delay instead of SAN delay, if an I/O operation has a delay at the host and all data transfers completed with no delay. If there are statistically significant number of I/O operations analyzed for the same host, it can be concluded that the host is slow, but not the SAN.

If host delay is high and the time for data transfers is high, it can be a problem of the SAN instead of the host. If host delay is low and the time for data transfers is high, it is very likely a problem of the SAN. If host delay is high and the time for data transfers is low, it is very likely a problem of the host. If host delay is low and the time for data transfers is low, neither the host nor the SAN has a problem.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for latency measurement in a write I/O operation, the method comprising:
   measuring from a storage system side, by a storage system connected to a host via a storage network, a first time period for sending a reply from the storage system to the host, in response to receiving a command of a write I/O operation, the first time period indicting performance of the storage system in its ability to process the command;
   measuring from the storage system side, by the storage system, a second time period for starting data transfer by the host and the storage area network between the host and the storage system, the second time period indicating latency caused by the host and the storage area network before the data transfer;
   measuring from the storage system side, by the storage system, a third time period for transferring each individual portion of data from the host to the storage system, the third time period indicating latency caused by the host and the storage area network during the data transfer;
   measuring from the storage system side, by the storage system, a fourth time period for writing the data to cache memory, acknowledging the host of completion of the write I/O operation, and writing the data on the storage system, the fourth time period indicating latency caused by the storage system;
   monitoring by the storage system using measured time periods taken in the write I/O operation, from the storage system side, whether a delay is caused by the host and the storage area network and caused by issues outside a scope of the storage system; and
   notifying, by the storage system, the host of the delay caused by the issues outside the scope of the storage system.

2. The method of claim 1, further comprises:
   receiving, by the storage system, from the host, the command of the write I/O operation.

3. The method of claim 1, further comprising:
   logging, by the storage system, the measured time periods taken in the write I/O operation.

4. The method of claim 1, wherein the first time period is from a first time point to a second time point, the first time point is when the storage system receives from the host the command of the write I/O operation, and the second time point is when the storage system sends to the host an acknowledgement of being ready for the data transfer.

5. The method of claim 4, wherein the second time period is from the second time point to a third time point, the third time point is when the storage system receives from the host a first individual portion of the data.

6. The method of claim 5, wherein the third time period is from the third time point to a fourth time point, the fourth time point is when the storage system receives from the host all individual portions of the data.

7. The method of claim 6, wherein the fourth time period is from the fourth time point to a fifth time point, the fifth time point is when the storage system sends to the host an acknowledgment of success of the write I/O operation.

8. A method for latency measurement in a read I/O operation, the method comprising:
   measuring from a storage system side, by a storage system connected to a host via a storage network, a first time period for reading data from a back end of the storage system, in response to receiving a command of a read I/O operation;

measuring from the storage system side, by the storage system, a second time period for transferring each individual portion of the data from the storage system to the host through the storage area network;

measuring from the storage system side, by the storage system, a third time period for acknowledging the host of completion of the read I/O operation;

monitoring by the storage system using measured time periods taken in the read I/O operation, from the storage system side, whether a delay is caused by at least one of hosts and the storage area network and caused by issues outside a scope of the storage system; and notifying, by the storage system, the host of the delay caused by the issues outside the scope of the storage system.

9. The method of claim 8, further comprises:
receiving, by the storage system, from the host, the command of the read I/O operation.

10. The method of claim 8, further comprising:
logging, by the storage system, the measured time periods taken in the read I/O operation.

11. The method of claim 8, wherein the first time period is from a first time point to a second time point, the first time point is when the storage system receives from the host the command of the read I/O operation, and the second time point is when the storage system sends to the host a first individual portion of the data.

12. The method of claim 11, wherein the second time period is from the second time point to a third time point, the third time point is when the storage system completes data transfer for all individual portions of the data.

13. The method of claim 12, wherein the third time period is from the third time point to a fourth time point, the fourth time point is when the storage system sends to the host an acknowledgment of success of the read I/O operation.

14. A computer program product for latency measurement in a write I/O operation, the computer program product comprising one or more computer-readable tangible storage devices and program instructions stored on at least one of the one or more computer-readable tangible storage devices, the program instructions executable to:

measure from a storage system side, by a storage system connected to a host via a storage network, a first time period for sending a reply from the storage system to the host, in response to receiving a command of a write I/O operation, the first time period indicting performance of the storage system in its ability to process the command;

measure from the storage system side, by the storage system, a second time period for starting data transfer by the host and the storage area network between the host and the storage system, the second time period indicating latency caused by the host and the storage area network before the data transfer;

measure from the storage system side, by the storage system, a third time period for transferring each individual portion of data from the host to the storage system, the third time period indicating latency caused by the host and the storage area network during the data transfer;

measure from the storage system side, by the storage system, a fourth time period for writing the data to cache memory, acknowledge the host of completion of the write I/O operation, and write the data on the storage system, the fourth time period indicating latency caused by the storage system;

monitor by the storage system using measured time periods taken in the write I/O operation, from the storage system side, whether a delay is caused by the host and the storage area network and caused by issues outside a scope of the storage system; and notify, by the storage system, the host of the delay caused by the issues outside the scope of the storage system.

15. The computer program product of claim 14, further comprising the program instructions executable to:
receive, by the storage system, from the host, the command of the write I/O operation.

16. The computer program product of claim 14, further comprising the program instructions executable to:
log, the storage system, the measured time periods taken in the write I/O operation.

17. The computer program product of claim 14, wherein the first time period is from a first time point to a second time point, the first time point is when the storage system receives from the host the command of the write I/O operation, and the second time point is when the storage system sends to the host an acknowledgement of being ready for the data transfer.

18. The computer program product of claim 17, wherein the second time period is from the second time point to a third time point, the third time point is when the storage system receives from the host a first individual portion of the data.

19. The computer program product of claim 18, wherein the third time period is from the third time point to a fourth time point, the fourth time point is when the storage system receives from the host all individual portions of the data.

20. The computer program product of claim 19, wherein the fourth time period is from the fourth time point to a fifth time point, the fifth time point is when the storage system sends to the host an acknowledgment of success of the write I/O operation.

* * * * *